United States Patent
Pedersen

(10) Patent No.: US 11,187,204 B2
(45) Date of Patent: Nov. 30, 2021

(54) METHOD FOR FABRICATION OF A PROFILE FOR A SPAR CAP FOR A WIND TURBINE BLADE, SPAR CAP AND WIND TURBINE BLADE

(71) Applicant: SIEMENS GAMESA RENEWABLE ENERGY A/S, Brande (DK)

(72) Inventor: David Stien Pedersen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 49 days.

(21) Appl. No.: 16/246,704

(22) Filed: Jan. 14, 2019

(65) Prior Publication Data

US 2019/0219028 A1 Jul. 18, 2019

(30) Foreign Application Priority Data

Jan. 15, 2018 (EP) ..................... 18151621

(51) Int. Cl.
  *F03D 1/06* (2006.01)
  *B29C 70/52* (2006.01)
  (Continued)

(52) U.S. Cl.
  CPC .......... *F03D 1/0675* (2013.01); *B29C 70/202* (2013.01); *B29C 70/226* (2013.01);
  (Continued)

(58) Field of Classification Search
  CPC .......... B29L 2031/085; B29K 2309/08; B29K 2307/04; B29K 2105/108; B29C 70/52;
  (Continued)

(56) References Cited

U.S. PATENT DOCUMENTS

| 10,195,818 B2* | 2/2019 | Hawley ................... B32B 27/20 |
| 2007/0040294 A1* | 2/2007 | Arelt ..................... B29C 70/525 |
| | | 264/136 |

(Continued)

FOREIGN PATENT DOCUMENTS

| CN | 102039684 A | 5/2011 |
| CN | 102371686 A | 3/2012 |

(Continued)

OTHER PUBLICATIONS

EP Search Report dated Jul. 16, 2018 for Application No. 2017P21885EP.

(Continued)

*Primary Examiner* — Igor Kershteyn
*Assistant Examiner* — Andrew Thanh Bui
(74) *Attorney, Agent, or Firm* — Schmeiser, Olsen & Watts LLP

(57) ABSTRACT

Provided is a method for fabrication of a profile for a spar cap for a wind turbine blade, wherein the profile is fabricated in a pultruding process using one or more strands and/or layers of unidirectional fibres or rovings of unidirectional fibres arranged along a longitudinal direction of the profile and a tool for moulding of the fibres, wherein one or more additional fibres or rovings of additional fibres are introduced in the pultruding process prior to the moulding, wherein the additional fibres are arranged under an angle to the unidirectional fibres, and/or wherein one or more surficial fibres or rovings of surficial fibres are introduced in the pultruding process after the moulding, wherein the surficial fibres are arranged on the outer surface of the moulded profile.

11 Claims, 3 Drawing Sheets

Figure 1:
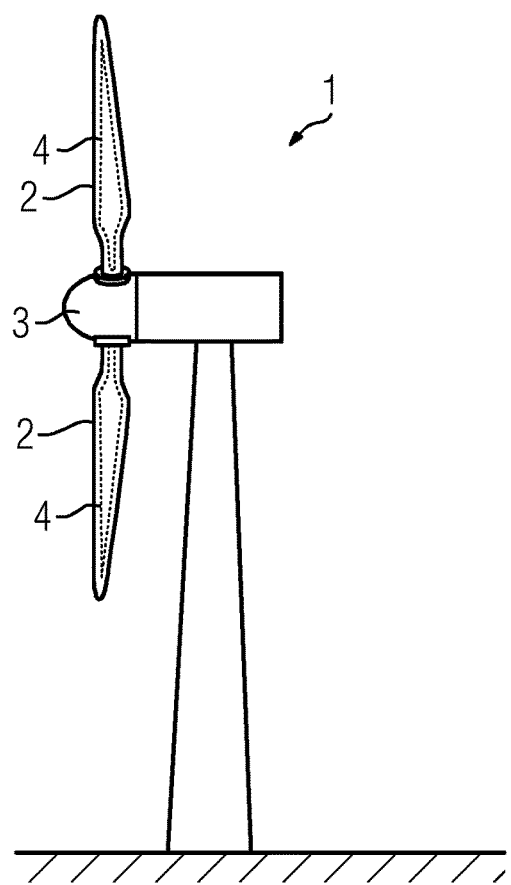

(51) Int. Cl.
- *B29C 70/22* (2006.01)
- *B29C 70/20* (2006.01)
- *B29K 105/10* (2006.01)
- *B29K 307/04* (2006.01)
- *B29K 309/08* (2006.01)
- *B29L 31/08* (2006.01)

(52) U.S. Cl.
CPC ........ *B29C 70/52* (2013.01); *B29K 2105/106* (2013.01); *B29K 2105/108* (2013.01); *B29K 2307/04* (2013.01); *B29K 2309/08* (2013.01); *B29L 2031/085* (2013.01); *F05B 2230/20* (2013.01); *F05B 2280/2001* (2013.01); *F05B 2280/2006* (2013.01)

(58) Field of Classification Search
CPC ... B29C 70/226; B29C 70/202; F03D 1/0675; F03D 3/062; F05D 2300/602; F05D 2300/601; F05D 2300/603; F05D 2300/6034; F05D 2300/614; D04H 1/4374

See application file for complete search history.

(56) References Cited

U.S. PATENT DOCUMENTS

| | | |
|---|---|---|
| 2011/0091684 A1 | 4/2011 | Holloway |
| 2012/0009069 A1 | 1/2012 | Grove-Nielsen |
| 2016/0146185 A1 | 5/2016 | Yarbrough et al. |
| 2016/0263844 A1* | 9/2016 | Smith .................. B29C 70/547 |
| 2017/0082089 A1 | 3/2017 | Yarbrough et al. |

FOREIGN PATENT DOCUMENTS

| | | |
|---|---|---|
| CN | 105619844 A | 6/2016 |
| DE | 102010050874 A1 | 5/2012 |
| EP | 1754589 A1 | 2/2007 |
| EP | 2716434 A1 | 4/2014 |
| GB | 2519566 A | 4/2015 |
| WO | 2016025564 A2 | 2/2016 |
| WO | WO 2016025564 A2 | 2/2016 |

OTHER PUBLICATIONS

Non-English Chinese Office Action dated Aug. 31, 2020 for Application No. 201910036760.0.

* cited by examiner

METHOD FOR FABRICATION OF A PROFILE FOR A SPAR CAP FOR A WIND TURBINE BLADE, SPAR CAP AND WIND TURBINE BLADE

CROSS-REFERENCE TO RELATED APPLICATIONS

This application claims priority to European application No. EP 18151621.2, having a filing date of Jan. 15, 2018, the entire contents of which are hereby incorporated by reference.

FIELD OF TECHNOLOGY

The following relates to a method for fabrication of a profile for a spar cap for a wind turbine blade.

BACKGROUND

Spar caps are used as parts of wind turbine blades to increase their mechanical stability during operation of the wind turbine. In general, spar caps are aligned in a longitudinal direction of the wind turbine blade or in radial direction of the rotor, respectively. A spar cap can consist of one or more profiles, which are designed to withstand the loads during operation of the wind turbine. As the size or the length, respectively, of wind turbine blade designs are constantly increasing for obtaining larger and more efficient wind turbines, the requirements for the spar caps and their profiles regarding the stability are increasing as well.

SUMMARY

An aspect relates to a method for fabrication of a profile for a spar cap which enables the fabrication of improved profiles.

According to embodiments of the invention, this aspect is achieved by a method as initially described, wherein the profile is fabricated in a pultruding process using one or more strands and/or layers of unidirectional fibres or rovings of unidirectional fibres arranged along a longitudinal direction of the profile and a tool for moulding of the fibres, wherein one or more additional fibres or rovings of additional fibres are introduced in the pultruding process prior to the moulding, wherein the additional fibres are arranged under an angle to the unidirectional fibres, and/or wherein one or more surficial fibres or rovings of surficial fibres are introduced in the pultruding process after the moulding, wherein the surficial fibres are arranged on the outer surface of the moulded profile.

It is an advantage of the fabrication method according to embodiments of the invention that the mechanical stability of the profiles fabricated by this method is increased. By both the additional fibres and by the surficial fibres, the mechanical stability of the profile consisting of unidirectional fibres arranged in a longitudinal direction of the profile is increased. Additionally, the use of surficial fibres can increase the surface roughness of the profile facilitating its integration in the spar cap and/or in a wind turbine blade since an increased surface roughness avoids that two smooth surfaces are pressed together making it difficult or impossible that a glue or an adhesive enters between the surfaces. An increased roughness of at least one of the surfaces avoids this since the glue or the adhesive is able to enter the space between two or more components pressed together.

The additional fibres are introduced in the pultruding process prior to the moulding of all fibres in the tool. The additional fibres are arranged at an angle to the unidirectional fibres increasing the mechanical stability of the profile in a direction perpendicular to the unidirectional fibres or the longitudinal direction of the profile, respectively. By introducing the additional fibres prior to the moulding process, a composite material consisting of both the unidirectional fibres and the additional fibres can be formed in the moulding process. The moulding can occur for instance by injection moulding, wherein a glue or an adhesive like resin is injected in between the fibres to form a fibre composite material. The pultruding of the fibres may occur along the longitudinal direction of the profile, so that the fabrication of long, one-piece profiles is enabled.

In a preferred embodiment of the invention, it may be provided that the one or more additional fibres introduced prior to the moulding are wound around the unidirectional fibres fed into the tool. Additional fibres wound around the unidirectional fibres improve significantly the properties of the profiles regarding their mechanical stability across the main fibre direction of the unidirectional fibres. The winding of the fibres can be achieved for instance using a roll of the additional fibres, which is running around the unidirectional fibres before they are fed into the tool.

Additionally or alternatively, it may be provided that as additional fibres or rovings of additional fibres unidirectional fibres or rovings of unidirectional fibres are used, which are deflected in a cross direction before being fed into the tool. By deflecting one or more unidirectional fibres or rovings or unidirectional fibres prior to the moulding and before they are fed into the tool, also an arrangement of the additional fibres under an angle to the unidirectional fibres is achieved. The deflection can occur for instance in alternating directions, so that a zigzag arrangement of the additional fibres is obtained. It is possible that for instance in each layer of unidirectional fibres one or more fibres or rovings of fibres are deflected in this manner.

After the arrangement of the one or more surficial fibres on the outer surface of the profile, a curing step comprising the curing of the profile is conducted. This curing step can lead in particular to a solidification of the profile by curing for instance a glue or an adhesive that was injected in between the fibres.

The surficial fibres or rovings of surficial fibres can be introduced in an advantageous manner directly after the moulding of the profile in the tool prior to a curing step, in which the moulded profile is cured. Prior to the curing, the surface of the moulded profile can be adhesive, so that the surficial fibres or rovings of surficial fibres arranged on the surface of the profile are sticking to the surface and are therefore adhesively attached to it. Subsequently, a curing step of the profile can be performed to solidify the glue, or the adhesive injected between the fibres during the moulding process to obtain a solid structure of the profile.

Additionally or alternatively, it may be provided that prior to the arrangement of the one or more surficial fibres on the outer surface of the profile, a grinding step comprising the grinding of the outer surface of the profile is conducted. The grinding step is performed prior to the use of the profile for fabrication of the spar cap to roughen the flat surface, which occurs after the moulding and the subsequent curing. It is also possible to arrange the one or more surficial fibres or rovings of surficial fibres on the surface of the profile after the grinding process, in particular before continuing processing of the profile.

The one or more surficial fibres or rovings of surficial fibres are wound around the outer surface of the profile at an angle to the longitudinal direction of the profile. By winding the additional fibres around the outer surface of the profile, the mechanical stability of the profile as well as its surface roughness can be increased. The surficial fibres can be applied both to a profile which consists only of unidirectional fibres and to a profile, which consists of unidirectional fibres as well as of additional fibres like previously described. The surficial fibre or the rovings of surficial fibres can be wound in such a manner around the outer surface of the profile that they become arranged for example at an angle of 30°, 45°, 60° or 90° to the unidirectional fibres. It is also possible that some portions of the surficial fibres or some portions of the rovings of surficial fibres exhibit a different angle to the unidirectional fibres than other portions of the fibres or rovings, respectively, so that in some areas for instance a 45°-angle is achieved in other areas of the surface a 90°-angle is obtained. It may be provided that the surficial fibres have for instance different angles on a top surface and/or on a bottom surface of the profiles than on the side surfaces of the profile. If multiple layers of surficial fibres or rovings of surficial fibres are used, it can be possible that different layers of the surficial fibres or rovings of surficial fibres exhibit each a different angle to the direction of the unidirectional fibres.

It may be provided that one or more surficial fibres or rovings of surficial fibres are arranged along the longitudinal direction of the profile and/or at an angle, in particular at an angle of approximately 90°, to the longitudinal direction covering the outer surface at least partially. The advantageous effect of increasing the surface roughness of the profile can be achieved also by surficial fibres or rovings of surficial fibres, which are aligned along the longitudinal axis or under an angle to the longitudinal direction of the profile. It is possible that the surficial fibres or rovings of surficial fibres are aligned under an angle of 90° to the longitudinal direction of the profile or the direction of the unidirectional fibres, respectively. It is possible that only the top side of the profile or the top side and the bottom side of the profile are covered by the surficial fibres or by the rovings of surficial fibres. It is also possible that several surficial fibres or rovings of surficial fibres are arranged for instance on the top side of the profile in such a manner that there is at least one gap between the fibres or the rovings, respectively. Such a gap facilitates the entering of the glue or the adhesive during a subsequent step of moulding during a fabrication of a spar cap and/or of a wind turbine blade comprising the profile.

Embodiments of the invention may provide that glass fibres and/or carbon fibres are used as unidirectional fibres and/or as additional fibres and/or as surficial fibres. Fibre-based composite materials consisting of glass fibres and/or carbon fibres have a comparatively high mechanical strength and a comparatively low weight or density, respectively. Especially the use of carbon fibres for the fabrication of the profiles facilitates the fabrication of large spar caps or large wind turbine blades, respectively, due to the high mechanical stability of carbon fibre-based materials. Carbon fibres, which are applied as surficial fibres, can also enhance the electrical properties of the profiles, since the carbon fibres are electrically conductive, so that an integration of the profile for instance in a lightning protection system of the wind turbine blade is facilitated due to the electrically conductive fibres at the surface of the profile.

In an embodiment of the invention, it may be provided that one or more mats comprising biaxial or triaxial fibres are used as additional fibres and/or as surficial fibres. In this manner, not only single fibres or rovings of fibres are introduced as strands to the process, but also mats comprising of different strength of fibres aligned for instance in a biaxial or triaxial manner can be used.

In this way, more complex arrangements for the fibre structure of the profile can be achieved both by adding biaxial and/or triaxial mats as additional fibres prior to the moulding of the profile and/or by adding biaxial or triaxial mats of fibres as surficial fibres to the outer surface of the profile after moulding. Of course, biaxial and/or triaxial mats of carbon fibres and/or glass fibres can be used.

A profile according to embodiments of the invention comprises one or more strands and/or layers of unidirectional fibres or rovings of unidirectional fibres arranged along a longitudinal direction of the profile and one or more additional fibres or rovings of additional fibres, which are arranged under an angle to the unidirectional fibres, and/or one or more surficial fibres or rovings of surficial fibres, which are arranged on the outer surface of the moulded profile. It is possible that the profile according to embodiments of the invention is fabricated by a method according to embodiments of the invention.

The aforementioned features and advantages of the method for fabricating a profile also apply for the profile according to embodiments of the invention.

A spar cap according to embodiments of the invention comprises at least one profile according to embodiments of the invention and/or at least one profile fabricated according to a method according to embodiments of the invention.

A wind turbine blade according to embodiments of the invention comprises a spar cap according to embodiments of the invention.

Both for a spar cap according to embodiments of the invention and for a wind turbine blade according to embodiments of the invention, both the features and the advantages described for the method for fabrication of a profile and the profile according to embodiments of the invention apply respectively.

BRIEF DESCRIPTION

Figure 2:
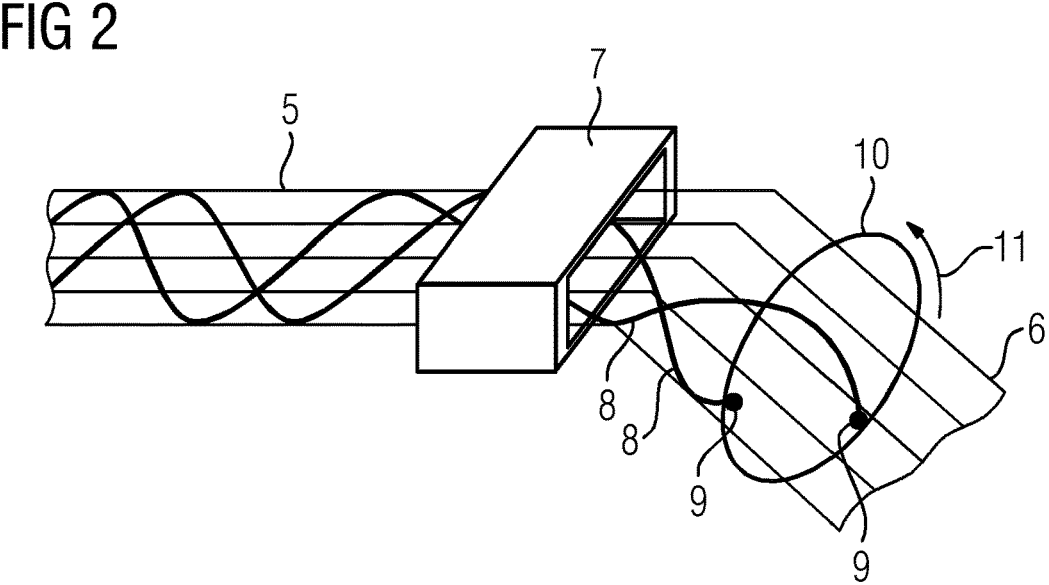
Figure 3:
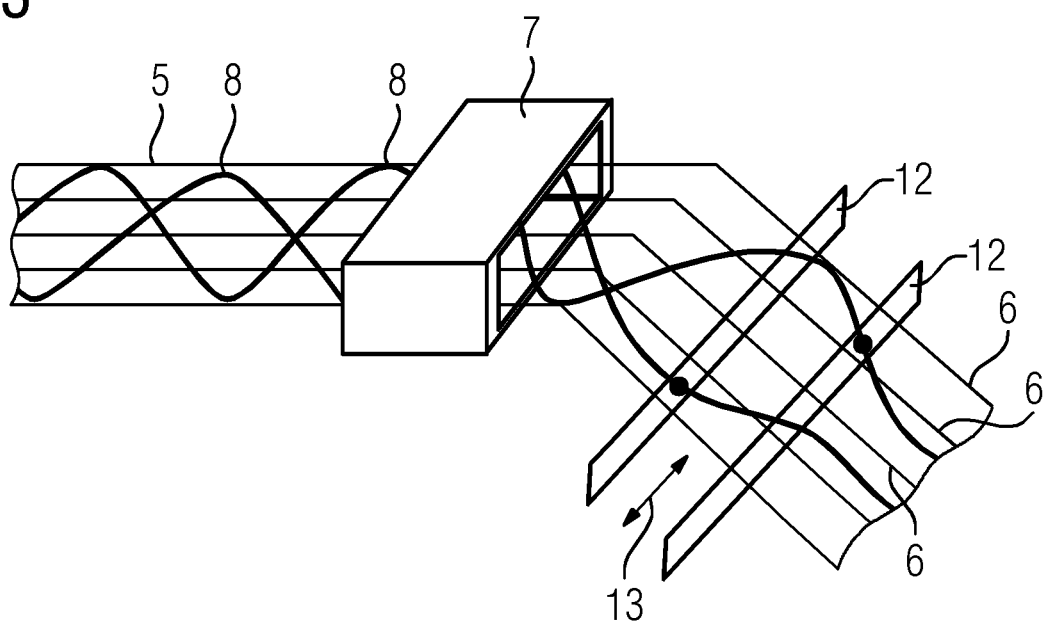
Figure 4:
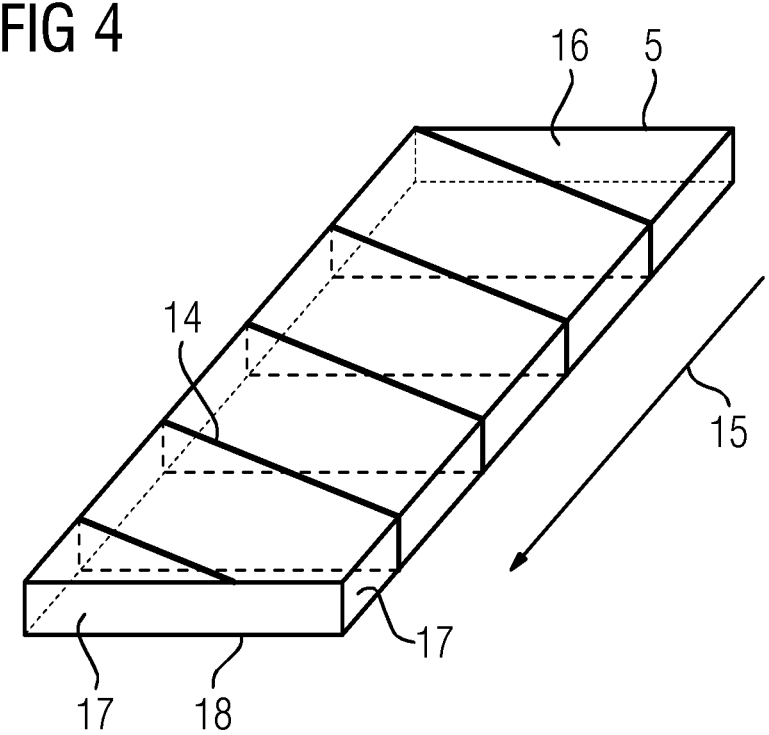
Figure 5:
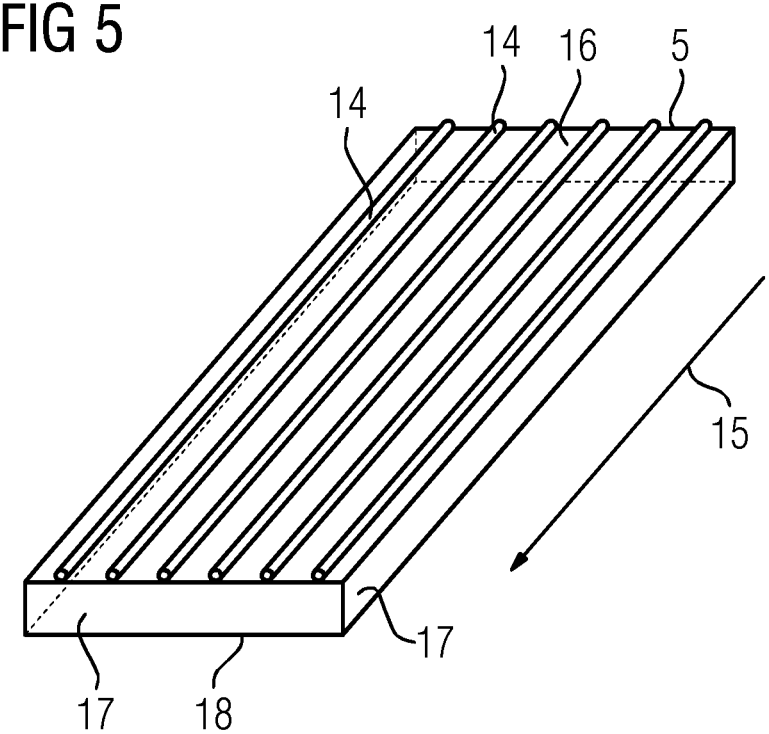

Some of the embodiments will be described in detail, with references to the following Figures, wherein like designations denote like members, wherein:

FIG. 1 a schematic view of a wind turbine;

FIG. 2 a schematic view of an arrangement used for performing a first embodiment of a method;

FIG. 3 a schematic view of a second arrangement used for performing a second embodiment of a method;

FIG. 4 a first embodiment of a profile with surficial fibres;

FIG. 5 a second embodiment of a profile with surficial fibres; and

Figure 6:
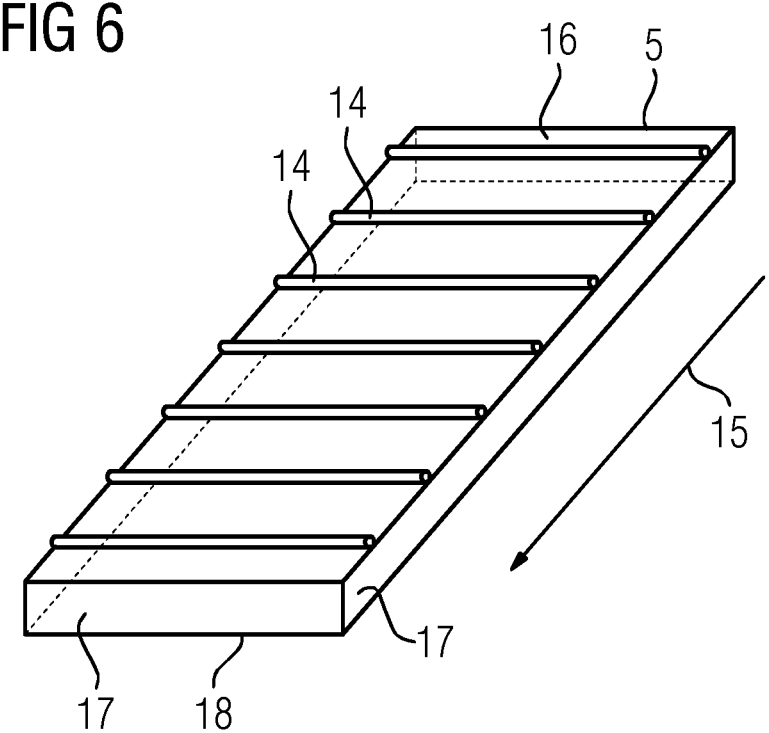

FIG. 6 a third embodiment of a profile with surficial fibres.

DETAILED DESCRIPTION

In FIG. 1 a schematic view of a wind turbine 1 is shown. The wind turbine 1 comprises a plurality of wind turbine blades 2, which are attached to a hub 3 of the wind turbine 1. Each wind turbine blade 2 comprises one or more spar caps 4 maintaining the mechanical stability of the wind turbine blades 2 during operation of the wind turbine 1. The position of the spar caps 4 within the wind turbine blades 2 is depicted schematically by the dashed lines. Each spar cap 4 can comprise one or more profiles 5. To ensure both a high mechanical stability of such a profile 5 and a comparatively low weight, these profiles 5 can be fabricated of a fibre-based, in particular glass fibre-based or carbon fibre-based, composite material.

In FIG. 2, an arrangement for performing a method for fabrication of a profile 5 for a spar cap 4 according to embodiments of the invention is shown schematically. The profile 5 is fabricated in a pultruding process, wherein a plurality of unidirectional fibres 6 or rovings of unidirectional fibres is set into a tool 7 used for casting the profile 5. The profile 5 is depicted only schematically as a plurality of fibres. The profile 5 can have for instance a rectangular cross section. Of course, also other shapes for the cross section are possible. In this embodiment, two additional fibres 8 are introduced in the pultruding process prior to the moulding of the fibres in the tool 7. For a better distinguishability, the additional fibres 8 are drawn with a thicker line than the unidirectional fibres 6. However, the additional fibres or the rovings of additional fibres can have the same thickness as the unidirectional fibres 6. To achieve an alignment of the additional fibres 8, in which they are arranged under an angle to the unidirectional fibres 6, the additional fibres 8 are wound around the unidirectional fibres 6. This can be achieved for instance by moving rolls 9 of additional fibres 8 on a circular trajectory 10 around the unidirectional fibres 6. The turning direction is indicated by an arrow 11.

In the tool 7, the profile 5 can be casted for instance by injection moulding. Therefore, for instance a glue or an adhesive is injected in the fibre structure in the tool 7. Afterwards, the profile fabricated this way can be solidified in a subsequent curing process step.

In FIG. 3, an alternative embodiment for an arrangement for performing an embodiment of the method according to embodiments of the invention is shown. In this embodiment, unidirectional fibres 6 are used as additional fibres 8. An arrangement of the additional fibres 8 under an angle to the direction of the unidirectional fibres 6 is achieved by deflecting the additional fibres 8 in a direction perpendicular to the direction of the unidirectional fibres or the longitudinal direction of the profile, respectively. This can be done for instance by using one or more deflection members 12, which are alternatingly moved in a direction across the direction of the unidirectional fibres or the longitudinal direction of the profile, respectively. The direction of movement of the deflection members 12 is indicated by an arrow 13.

In FIG. 4, an embodiment of a profile 5 according to the invention is shown. During the fabrication of the profile 5, one or more surficial fibres 14 or rovings of surficial fibres 14 can be arranged on the outside of the profile 5. The surficial fibres 14 or rovings of surficial fibres 14 can be for instance wound around an outer surface of the profile 5, wherein the outer surface comprises a top surface 16, side surfaces 17 and a bottom surface 18. The arrangement of the surficial fibres 14 can occur for instance directly after the profile 5 is coming out of the tool 7 and prior to a curing process. Directly after leaving the tool 7, the outer surface of the profile can be sticky due to the adhesive injected in the tool 7. By winding them around, the surficial fibres 14 can be attached to the surface of the profile 5.

The surficial fibres 14 are arranged on the outer surface, so that they are aligned under an angle to the unidirectional fibres of the profile 5, which are arranged along the longitudinal axis of the profile 5. The longitudinal axis of the profile is indicated by an arrow 15. The surficial fibres 14 are arranged on the top surface 16 under an angle of approximately 45° to the unidirectional fibres of the profile 5 arranged in the longitudinal direction of the profile 5. On the side surface 17 the surficial fibres 14 or rovings of surficial fibres 14 are arranged perpendicular to the longitudinal direction of the profile 5.

It is also possible that the surficial fibres 14 are arranged on the side surfaces 17 under the same angle as on the top side 16 and/or on a bottom side 18 of the profile 5. It is also possible that the surficial fibres 14 on the top side 16 and the bottom side 18 are arranged under the same angle with respect to the longitudinal direction of the profile 5. Angles, under which the surficial fibres can be aligned, may be for instance 15°, 30°, 45°, 60° and/or 90° or any other angle.

It is also possible that the surficial fibres 14 are arranged on the outer surface of the profile 5 after a grinding process, which occurs for instance prior to a usage of the profile 5 for fabrication of a spar cap 4 and/or a wind turbine blade 2. The surficial fibres 14 or rovings of surficial fibres 14 increase the surface roughness of the profile 5 improving a resin injection process in a subsequent processing of the profile 5.

In FIG. 5, a second embodiment of a profile according to the invention is shown. In this embodiment, the surficial fibres 14 are arranged on the top surface 16 of the profile 5 in the longitudinal direction of the profile 5 indicated by the arrow 15. It is possible that the surficial fibres 14 are arranged parallel or substantially parallel to the unidirectional fibres aligned along the longitudinal direction of the profile 5.

In FIG. 6, a third embodiment of a profile 5 according to the invention is shown. In this embodiment, the surficial fibres 14 or rovings of surficial fibres 14 are arranged on the top side 16 of the profile 5 perpendicular to the longitudinal direction of the profile 5 indicated by the arrow 15. It is possible that the surficial fibres 14 only cover part of this top surface 16, so that the gap in between the fibres or rovings of fibres remains, increasing the surface roughness and facilitating the subsequent processing of the profile 5 in the fabrication of a spar cap and/or a wind turbine blade. Besides an orientation perpendicular to the longitudinal direction of the profile, also an orientation of the surficial fibres under other angles like 15°, 30°, 45°, 60° and/or 90° or any other angle is possible.

Of course, it is possible that an arrangement of the surficial fibres as previously shown is combined with a fabrication method according to FIG. 2 or FIG. 3. It is possible that the arrangement of the surficial fibres 14 occurs after the pultruding process of the profile 5 and/or during the pultruding process and/or after the casting of the profile 5 in the tool 17.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for fabrication of a profile for a spar cap for a wind turbine blade, the method comprising:
   fabricating the profile in a pultruding process using one or more strands and/or layers of unidirectional fibres or rovings of unidirectional fibres arranged along a longitudinal direction of the profile; and
   moulding the fibres with a tool for moulding fibres, wherein one or more additional fibres or rovings of additional fibres are introduced in the pultruding process prior to the moulding;

wherein the additional fibres are arranged at an angle to the unidirectional fibres by deflecting the additional fibres in a direction perpendicular to the longitudinal direction of the profile using one or more deflection members that are moved across the longitudinal direction of the profile, before being fed into the tool, wherein one or more surficial fibres or rovings of surficial fibres are introduced in the pultruding process after the moulding;

wherein the surficial fibres are arranged on the outer surface of the moulded profile.

2. The method according to claim 1, wherein the one or more additional fibres introduced prior to the moulding are wound around the unidirectional fibres fed into the tool.

3. The method according to claim 1, further comprising: after the one or more surficial fibres are arranged on an outer surface of the profile, curing the profile.

4. The method according to claim 1, further comprising: prior to the one or more surficial fibres being arranged on an outer surface of the profile, grinding the outer surface of the profile.

5. The method according to claim 1, wherein the one or more surficial fibres or rovings of surficial fibres are wound around an outer surface of the profile at an angle to the longitudinal direction of the profile.

6. The method according to claim 1, wherein the one or more surficial fibres or rovings of surficial fibres are arranged along the longitudinal direction of the profile and/or at an angle of approximately 90° to the longitudinal direction covering an outer surface at least partially.

7. The method according to claim 1, wherein glass fibres and/or carbon fibres are used as unidirectional fibres and/or as additional fibres and/or as surficial fibres.

8. The method according to claim 1, wherein one or more mats comprising biaxial or triaxial fibres are used as additional fibres and/or as surficial fibres.

9. A profile produced according to the method of claim 1, comprising one or more strands and/or layers of unidirectional fibres or rovings of unidirectional fibres arranged along a longitudinal direction of the profile and one or more additional fibres or rovings of additional fibres, which are arranged at an angle to the unidirectional fibres, and one or more surficial fibres or rovings of surficial fibres, which are arranged on an outer surface of the moulded profile.

10. A spar cap comprising at least one profile fabricated according to the method of claim 1.

11. A wind turbine blade comprising a spar cap according to claim 10.

* * * * *